United States Patent [19]

Suzukawa et al.

[11] 3,856,441

[45] Dec. 24, 1974

[54] APPARATUS FOR PELLETIZING POWDERED SOLID SUBSTANCE IN A FLUIDIZED BED

[75] Inventors: Yuichi Suzukawa; Hisashi Kono; Atushi Kuribayashi, all of Ube, Japan

[73] Assignee: UBE Industries, Ltd., Ube-shi, Yamaguchi-ken, Japan

[22] Filed: Nov. 3, 1972

[21] Appl. No.: 303,304

Related U.S. Application Data

[63] Continuation of Ser. No. 85,611, Oct. 30, 1970, abandoned, which is a continuation of Ser. No. 839,749, April 15, 1969, abandoned, which is a continuation-in-part of Ser. No. 554,082, May 31, 1966, abandoned.

[52] U.S. Cl............... 425/7, 264/12, 264/DIG. 51, 264/117
[51] Int. Cl............................................. B22d 23/08
[58] Field of Search.............. 425/6, 7; 264/117, 13, 264/12, 14, DIG. 51

[56] References Cited
UNITED STATES PATENTS

| | | |
|---|---|---|
| 2,968,833 | 1/1961 | De Haven et al................. 425/6 X |
| 3,001,228 | 9/1961 | Nach.................................. 425/6 X |
| 3,042,526 | 7/1962 | Spiess, Jr. et al............ 264/117 UX |
| 3,043,652 | 7/1962 | Schytil....................... 264/DIG. 51 |
| 3,048,887 | 8/1962 | Weiland............................. 425/6 X |
| 3,071,804 | 1/1963 | Meek................................. 425/6 X |
| 3,340,567 | 9/1967 | Flack et al............................. 425/7 |

*Primary Examiner*—Robert L. Spicer, Jr.
*Attorney, Agent, or Firm*—Curtis, Morris & Safford

[57] ABSTRACT

A method of pelletizing powdered solid substance in a fluidized bed in which powdered solid substance is fed and liquid substance is atomized and a gas jet stream for the selective discharge is injected through a selective discharge opening provided at the center portion of a funnel shaped gas distributor to discharge selectively the coarse final pellets. The gas jet stream sets the solid particles in the bed into a forced circulation flow which has the essential role in dispersing powdered solid and liquid substance throughout the bed as well as the role in said selective discharge process.

9 Claims, 1 Drawing Figure

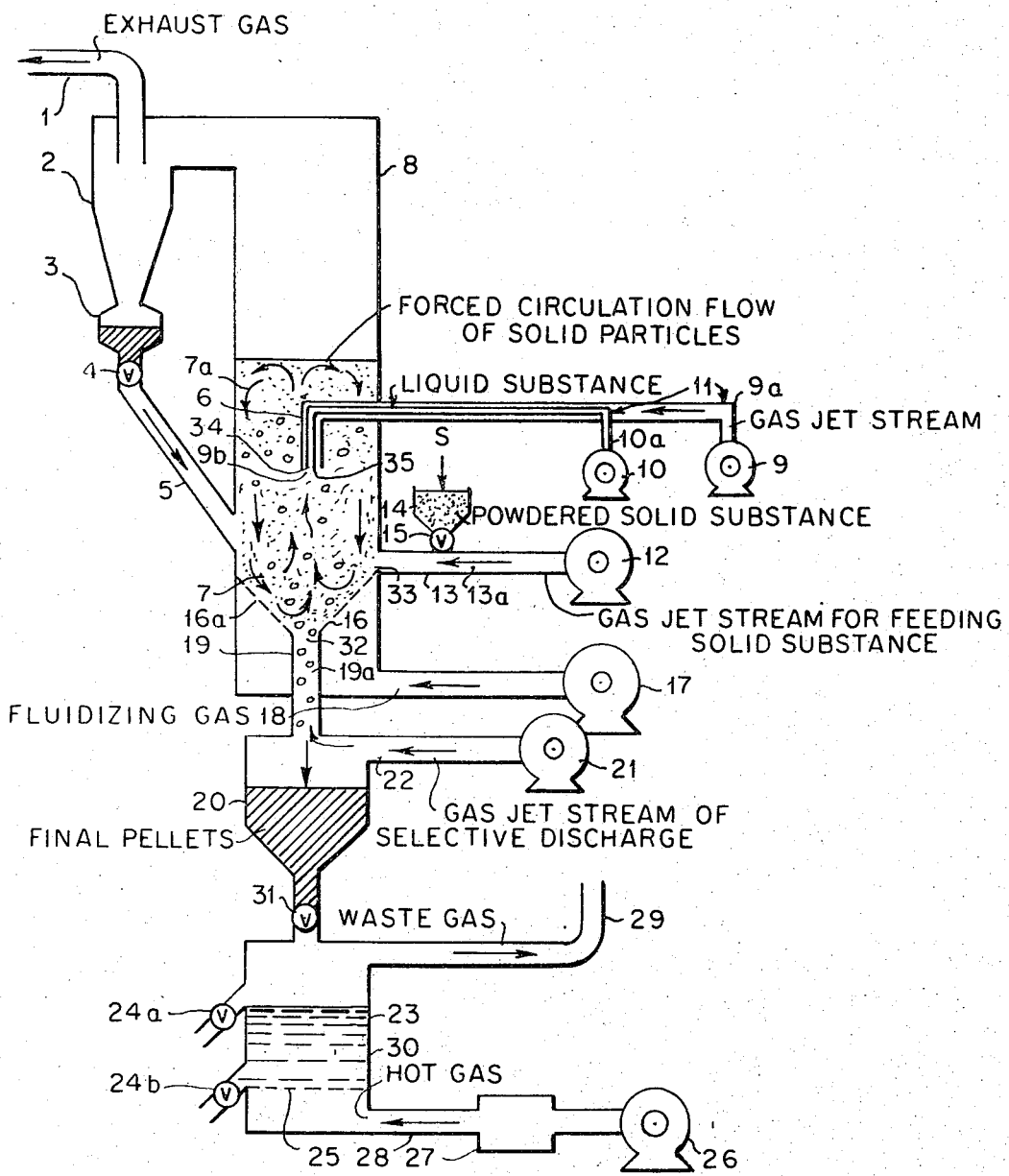

APPARATUS FOR PELLETIZING POWDERED SOLID SUBSTANCE IN A FLUIDIZED BED

This application is filed as a continuation application of our co-pending application Ser. No. 85,611, now abandoned filed Oct. 30, 1970, which was a continuation-in-part application of our copending application Ser. No. 839,749, now abandoned, filed Apr. 15, 1969, which in turn is a continuation-in-part application of our prior application Ser. No. 554,082, now abandoned filed May 31, 1966.

The present invention relates to a method of and apparatus for pelletizing powdered solid substances by a fluidized bed technique.

It is well known that a large quantity of pellets can be economically produced by conventional pelletizing methods using rotation-type pelletizing machines, such as a disk or trommel machines which utilize capillary energy between the liquid substance and the powdered solid substances or using pug mill-type machines. However, it is generally difficult to make pellets smaller than 5 mm in diameter economically by the above methods. Further it is also known to make small pellets by a press pelletizing method. However, such a method is expensive and therefore is not suitable for pelletizing relatively inexpensive powdered solid substances.

One object of the present invention is to provide an economical method suitable for pelletizing powdered solid substances into small pellets.

Other objects and advantages of the present invention are apparent from the following description.

The present invention provides a method of pelletizing powdered solid substances in a fluidized bed. Powdered solid substances are fed, and a liquid substance is atomized in a fluidized bed, while the forced circulation flow of solid particles and the liquid substance in the bed is realized by injecting gas jet streams.

Forced circulation flow in the invention means the convection type movement of the solid particles within the bed. Upward flow of the gas jet stream is introduced into the fluidized bed through the opening which is provided at the center of the funnel-shaped gas distributor. This gas jet stream has such a velocity that solid particles above the opening are brought up to the bed surface and particles at the vicinity of the wall flow into the center portion of the bed along the funnel-shaped gas distributor.

For the purpose of the present specification, the term "powdered solid substance" includes not only so-called "powder" as defined by the British Standard Institution, i.e. dry particles of solid substances smaller than 1,000$\mu$ (micron), but also powder containing a minor amount of solid particles larger than 1,000$\mu$ (micron). Further, powder containing a small amount of moisture insufficient for the agglomeration thereof are also intended to fall within the scope of the term "powdered solid substance".

The term "liquid substance" is intended to include not only pure liquids but also various solutions, emulsions, and slurries and mixtures thereof.

The total gas ($V_o$) for maintaining the fluidizing state is the sum of the quantity of fluidizing gas which passes through the gas distributor ($V_F$) and the quantity of three gases (such as $V_J$, $V_R$ and $V_A$) entering directly into the bed as gas jet streams. Thus, $V_o = V_F + V_J + V_R + V_A$ The term "gas jet stream" means a gas stream which has a velocity higher than the superficial velocity in the fluidized bed and which does not pass through the gas distributor.

There are three different gas jet streams. One for selective discharge ($V_J$), another for feeding powdered solid substance ($V_R$), and another for atomizing liquid substance ($V_A$).

The term "pellets" is used herein to mean aggregates which are produced as the result of capillary phenomenon and additional secondary forces between powdered solid substances and the liquid substance.

Also, the term "solid particles in a fluidized bed" is used herein to mean powdered solid substances, pellets produced therefrom, and aggregates intermediate between the powdered solid substance and pellets which are held in the fluidized bed.

The present invention has two important features with respect to pelletizing powdered solid substances by a fluidized bed technique. Particularly, one of the features is that the forced circulation flow of the solid particles and the liquid substance in the fluidized bed is realized by injecting at least one gas jet stream directly into the bed through an opening provided at the center portion of a funnel-shaped gas distributor. Thus, the dispersed state of liquid substance and powdered solid substances fed into the bed can be controlled by regulating the gas jet streams. The other feature is that the size distribution of solid particles in the fluidized bed can be controlled by selective discharge of coarse final pellets from the bed. Further, the size distribution can be controlled by feeding seeds of pellets into the bed. As a result, a stable fluidizing state is accomplished.

In the present invention, the principal process of the growth of pellets in a fluidized bed is as follows: the growth of pellets proceeds in a way by the capturing of powdered solid and liquid substances on the surface and growing layer as the result of capillary phenomenon in the solid-liquid-gas system and also by way of additional secondary forces by which powders are firmly agglomerated on the surface of solid particles in the bed.

In order to control such pelletizing mechanism in a fluidized bed, it is necessary that the dispersed state of powdered solid substances and the liquid substance introduced into the bed is controlled in a suitable state and that the fluidized bed is maintained in a stable fluidizing state. In order to maintain these conditions, it is necessary to adequately control the ratio between the superficial velocity in the fluidized bed and the average terminal velocity of solid particles in the fluidized bed. As the growth of pellets occur in the fluidized bed, it is necessary to discharge selectively only coarse final pellets from the bed and to prevent the formation of large aggregates during a continuous pelletizing operation in order to adequatley control the pelletizing process.

In order to discharge selectively the coarse final pellets from the fluidized bed by the principle of air screening, it is necessary to inject an upward gas jet stream into the bed through a discharge opening provided at the center portion of a funnel-shaped gas distributor. Any relatively coarse pellets, whose terminal velocities exceed the velocity of the gas jet stream, drop against said upward gas flow, thus leaving finer particles in the fluidized bed.

Furthermore, solid particles above said gas jet stream are brought up to the bed surface and particles at the vicinity of the wall flow into the center portion of the bed along the inclined walls of the funnel-shaped gas distributor. Thus, the funnel-shaped gas distributor and the gas jet stream induce the forced circulation flow, that is a convection type movement, of the solid particles within the bed. This forced circulation flow of the particles increases the chance of the coarse final pellets of reaching the discharge opening, resulting in improved selective discharge efficiency.

In a pelletizing operation by a fluidized bed technique, another important condition for controlling the size distribution of solid particles in the bed and thereby maintaining a stable fluidizing state is that the rate of generation of seeds in number in the fluidized bed should be approximately equal to the rate of discharge of the pellets in number.

For this purpose, any powdered solid substance containing the seeds which escapes from the fluidized bed should be collected by a cyclone or other suitable device connected to the exhaust port of the fluidizing vessel and returned again into the bed.

Alternatively, a small amount of seeds may be supplied to the fluidized bed so that the rate of generation of seeds in number is approximately equal to the rate of discharge of pellets in number.

The above mentioned injection of a gas jet stream is not only an effective means for the selective discharge of coarse final pellets but also assists the dispersion of the powdered solid substances and liquid substances in the fluidized bed.

In a conventional fluidized bed into which the total gas ($Vo$) for maintaining the fluidizing state is introduced through gas distributor, solid particles in the bed move locally by fluidization. However, no substantial flow of solid particles in the fluidized bed is observed, and there only occurs a slight downward flow near the wall of the fluidized vessel. Such a slight downward flow is insufficient to disperse efficiently powdered solid substances and a liquid substance throughout the fluidized bed.

As is well known, a spouted bed which is usually used for drying grains has no gas distributor, and all of the fluidizing gas is spouted directly into the bed as a gas jet stream. Accordingly, there occurs what is called a forced circulation flow. However, the spouted bed is not suitable for pelletizing powdered solid substances, because due to the absence of a gas distributor the flow of solid particles near the bottom of the bed is locally bad, and agglomeration of particles is liable to occur. Further, a spouted bed is also defective in that so-called gas blow-through phenomenon is liable to occur.

On the contrary, according to the method of the present invention, it is possible to obtain not only the local movements but also the forced circulation flow of solid particles throughout the bed. It is also possible to control the movement and flow of solid particles and liquid substance in the bed as required. Accordingly, it is possible to control the dispersed state of powdered solid substances and the liquid substance in the bed in accordance with the requirement of a pelletizing operation in a fluidized bed. Such controls could not be obtained in a conventional fluidized bed nor in a spouted bed.

The forced circulation flow of solid particles in the fluidized bed can be controlled as desired within a considerably wide range by changing $U_J/Uo$ and $V_J/Vo$; wherein $U_J$ (m/sec.) is the velocity of the injected gas jet stream, $Uo$ (m/sec.) is the superficial velocity in the fluidized bed of the total gas for maintaining the fluidizing state, $V_J$ (m³/hr.) is the volume flow rate of the injected gas jet stream for selective discharge, and $Vo$ (m³/hr.) is the volume flow rate of the total gas for maintaining the fluidizing state. A suitable range of $U_J/Uo$ is approximately from 1.5 to 20, and that of $V_J/Vo$ is approximately from 0.05 to 0.95.

Hitherto in the field of chemical engineering, the injection of a gas jet stream directly into a fluidized bed which does not pass through a gas distributor has been considered to induce undesirable blow-through phenomenon. For this reason, the direct introduction of a gas jet stream into a fluidized bed has generally been avoided.

However, for suitable values of $U_J/Uo$ the momentum of the gas jet stream is absorbed rapidly in the fluidized bed, and the blow-through phenomenon in the fluidized bed is prevented.

In order to promote the above mentioned forced circulation flow of solid particles in the bed, it is effective to make the gas distributor in a funnel-shaped form, where the injection opening of the gas jet stream is provided at the center thereof.

Another effect of using gas jet streams will be mentioned hereinafter. When a liquid substance is atomized in a fluidized bed, the gas jet stream is injected from the opening around the nozzle of liquid substance, so the space density of solid particles in the vicinity of the nozzle is lower than that in the other portions of the fluidized bed, the dispersion of liquid substance in the bed being promoted.

Further, another feature of the present invention to be emphasized is that the opening of the nozzle of the said liquid substance is located in the fluidized bed. Though the atomizing nozzle is inserted inside a fluidized bed, the opening of the nozzle is protected by the gas jet stream injected through its outside tube, so that the opening of the nozzle is never choked or clogged up with powdered solid substances.

In general, when powdered solid substances are pelletized, a portion of the powdered solid substance is wetted partially with an injected liqiud substance and then are adhered to the surface of intermediate pellets, while the other portion immediately adheres to the surface of pellets partially wetted. The ratio between the said portions (hereinafter referred to as $\gamma$ value) gives considerably a large influence on properties of the coarse final pellets and the rate of growth of pellets. When the pelletizing operation is carried out in a fluidized bed, there might be proposed a method in which liquid substance is atomized or sprayed above the fluidized bed. However, in such a method, it is difficult to control the above mentioned $\gamma$ value, and the dispersed state of liquid substance to solid particles in the fluidized bed is not satisfactory. Accordingly, using such a method it is difficult to prevent so-called agglomeration of the solid particles and the adhesion of powdered solid substances to the opening of the nozzle by which the liquid is introduced. On the contrary, according to the method of the present invention in which dispersed state of liquid substance atomized into fluidized bed is controlled, the above mentioned difficulties can be prevented.

As the method of feeding powdered solid substances into the fluidized bed, the use of the gas jet stream is most suitable. Alternatively, a screw conveyor or other feeding device can also be used. The dispersed state of powdered solid substances in the bed in the former case utilizing the gas jet stream is better than that in the latter case employing mechanical means.

Each gas jet stream introduced for spraying the liqiud substance and feeding the powdered solid substances help the quick dispersion of each substance into the bed. Furthermore, the forced circulation flow, that is the convection type movement of the solid particles in the fluidized bed induced by the additional gas jet stream for the selective discharge of the coarse final pellets, makes each such substance disperse throughout the bed.

Therefore, these three gas jet streams produce the combined effect in the pelletizing process. Especially, the gas jet stream for the selective discharge has the essential role even in the pelletizing process as well as the role for the selective discharge of the coarse final pellets described before.

When the content of moisture in the powdered solid substance is relatively small, it is suitable that the feeding of the powdered solid substance and the atomizing of the liquid substance be carried out independently, as above mentioned. However, in cases when the powdered solid substances and liquid substance are mixed into a slurry state, it is possible that said slurry is fed into the bed through the nozzle used for introducing the liquid substance, the temperature of the fluidizing gas being held as high as necessary for evaporating the water of slurry, and thereby the drying and pelletizing operations are done at the same time in the fluidized bed.

In general, the drying of the coarse final pellets discharged from the bed through the selective discharge pipe is easily carried out by using a dryer of the fluidized bed type or other type, if required.

The present invention can be applied to various industrial fields. For example, the powdered solid substances may be a fertilizers such as calcium superphosphate, ammonium sulfate, urea, or a compound fertilizers, cement raw mix and its dust, glass raw mix, lime (lime stone or slaked lime), clay, pottery raw material such as potterystone, feldspar, siliceous stone, or kaolin, an abrasive such as silicon carbide, cerium oxide, alumins, boron carbide, iron oxide, dolomite, or glass powder, alumina (bauxite), artificial silica, a refractory material such as siliceous stone, clay or the like, ceramic powder for atomic energy such as $UO_2$, $UC$, or $UN$, casting sand, raw material for iron ore, or pulverized coal, a metallurgical powder such as metal, alloy, and metal compounds, inorganic or organic chemicals, synthetic resins, agricultural chemicals with or without carrier, soil improving agents, catalysts with or without carrier, medicine, foods such as wheat flour, starch, glucose, dry milk, egg powder, or instant coffee, cleanser or carbon black, sugar, or filler.

The liquid substances used may be for example, water, other organic liquids, inorganic liquids, solutions or emulsions of organic and inorganic salts or the like, suspensions or slurries in which one or more of the above mentioned powdered solid substances are mixed with one or more of the said liquids, solutions or emulsions.

In order to understand the present invention, an embodiment thereof will be described by way of example, with reference to the accompanying drawing which is a schematic cross section of an apparatus suitable for pelletizing powdered solid substances in a fluidized bed.

Powdered solid substances S to be fed into a fluidized bed 7 fall down from hopper 14 through feeder 15 into a powdered solid substance feed pipe 13. Then, the powdered solid substance S passes through the feed pipe 13 together with a gas jet stream 13a introduced from a blower 12 and is fed into the fluidized bed 7 in fluidizing vessel 8 from the injection opening 33 for the introduction of powdered solid substance at the side of the fluidizing vessel 8. Alternatively, powdered solid substance can be fed into the fluidized bed 7 by other means. Solid particles and powdered solid substances in the fluidized bed 7 are fluidized in the fluidizing vessel 8 by a fluidizing gas 18 which passes through a blower 17, fluidizing gas inlet pipe and a funnel shaped gas distributor 16, and are set into a forced circulation flow in the fluidized bed 7 by a gas jet stream 19a for selective discharge. Said gas jet stream 19a for selective discharge is introduced through the selective discharge opening 32 after being discharged from a selective discharge blower 21, passing through a pipe 22, the top of a hopper 20, and selective discharge pipe 19 at a gas velocity sufficient to discharge the coarse final pellets from vessel 8.

In order to disperse liquid substance 35 into the fluidized bed 7, a double tube atomizing device 6 is utilized. Particularly, the liqiud substance 35 is fed into fluidized bed 7 through an inner tube 10a of a double tube 11 by means of a pump 10, is atomized through the opening of nozzle 34, is dispersed into the fluidized bed 7 by a gas jet stream 9b, which is compressed by a compressor 9, passes through the outer pipe 9a of the double tube 11, and is injected through the opening 34.

The coarse final pellets with a definite particles size in the fluidized bed 7 are discharged selectively to hopper 20 through the selective discharge pipe 19 provided in the bottom of the fluidizing vessel 8 in which the gas distributor 16 is shaped in a funnel shaped form around the selective discharge opening 32.

Minute particles containing seeds escaping from the fluidizing vessel 8 are separated from the gas with cyclone separator 2, and the gas is exhausted through exhaust pipe 1 into the air. The said particles are transferred to hopper 3 and recycled into the fluidized bed 7 after passing through feeder 4 and inclined pipe 5.

The gas jet stream 19a for selective discharge of coarse final pellets is introduced into the fluidized 7 at a definite gas velocity through selective discharge pipe 19 after passing through pipe 22, to selectively discharge coarse final pellets. This gas jet stream 19a has another function of providing the above mentioned forced movement of the solid particles in the fluidized bed 7. The aforesaid convection-type circulation flow is indicated by the arrows marked 7a in the drawing and is caused by the arrangement of the funnel shaped gas distributor 16 and the gas stream 19a for selective discharge. It will be noted that the particles at the bottom of the bed 7 flow into the central portion of the bed 7 along the inclined walls of the gas distributor 16.

Final pellets discharged into hopper 20 are transferred into a dryer 30 by means of a feeder 31. In the dryer 30, a gas stream preheated in a hot gas generator 27 is introduced through a blower 26, a pipe 28 and a gas distributor 25. Pellets 23 dried in the dryer 30 are discharged through discharge pipes 24a and 24b. The waste gas is exhausted from the exhaust pipe 29.

The start up of this pelletizing process is carried out as follows. Three gas jet streams one (19a) for selective discharge, another (13a) for feeding powdered solid substance, and another (9b) for atomizing liquid substance are injected into the fluidizing vessel 8 from respective opening 32, 33 and 34. A fluidizing gas is injected into the vessel 8 from the blower 17, through selective discharge pipe 19 and through openings 16a in the funnel shaped gas distributor 16. Coarse pellets and seeds which are needed to initially establish the fluidizing state are introduced into the bed 7 from the hopper 14 through feeder 15 and feed pipe 13.

Accordingly, a fluidized state is obtained by the fluidizing gas which passes through the openings 16a in gas distributor 16 and by the gases which enter directly into the bed as gas jet streams 19a, 13a, 9b. The solid particles in the fluidized bed 7 are set into a forced circulation flow in the fluidized bed 7 as indicated by the arrows 7a. Then liquid substance 35 is injected through the opening of nozzle 34 and is dispersed into the fluidized bed 7, and powdered solid substance S is fed into the bed 7 from hopper 14 through feeder 15 and feed pipe 13.

The growth of the solid particles in the fluidized bed 7 proceeds by the capturing of powdered solid and liquid substance on the surface and growing layer by layer as the result of capillary phenomenon in the solid-liquid-gas system.

Minute particles containing seeds escaping from the fluidizing vessel 8 are separated from the gas by cyclone separator 2. The said particles are transferred to hopper 3 and recycled into the fluidized bed 7.

The relatively coarse particles in the bed 7 are selectively discharged from the bed through the selective discharge opening 32 by the gas jet stream 19a. This selective discharge process is carried out by the so-called principle of air screening where any solid particles whose terminal velocities are higher than the velocity of the said gas jet stream drop against the said upward gas jet stream and are discharged from the bed 7. Thus finer particles remain in the bed 7.

Discharged coarse final pellets are dryed at a dryer 30 to the required moisture content of the products.

Some examples of the operation conditions and results of this fluidized bed pelletizing process are shown as follows.

EXAMPLE I

Cement raw mix was pelletized at the ratio of 200 kg/hr. using the fluidized bed pelletizing process which consists of a fluidizing vessel of 30 cm in diameter and 300 cm in height. Conditions employed and results were as follows.

| | |
|---|---|
| Production rate: | 200 kg/hr. |
| Powdered solid substance: | Cement raw mix |
| Fineness of the raw material: | 38 micron (under) 5% |
| Liquid substance: | water |
| Operating conditions of the fluidized bed: | |
| Superficial gas velocity: | $U_o = 1.1$ m/sec. |
| Relative amount of the fluidizing air which passes through the funnel shaped gas distributor. | $V_F/V_o = 0.6$ |
| Relative amount of the gas jet stream for feeding powdered solid substance: | $V_R/V_o$ ⎫ |
| Relative amount of the gas jet stream for spraying liquid substance: | $V_A/V_o$ ⎬ = 0.15 |
| Relative amount of the gas jet stream for the selective discharge: | $V_J/V_o = 0.25$ |
| Total gas for maintaining fluidized state: | $V_o = V_F + V_J + V_R + V_A$ |
| Velocity of the gas jet stream for the selective discharge. | $u_j = 6$ m/sec. |
| Moisture of the solid particles in the bed: | $m = 10\%$ (wet basis) |

Size distribution of the solid particles:

| SIEVE (ASTM) | | IN THE BED | PRODUCTS |
|---|---|---|---|
| Larger | No.10 (2.00mm) | | 0.02 |
| Between | No.10 (2.00mm) and No.14 (1.41mm) | 0.02 | 0.12 |
| Between | No.14 (1.41mm) and No.18 (1.00mm) | 0.07 | 0.25 |
| Between | No.18 (1.00mm) and No.25 (0.71mm) | 0.18 | 0.34 |
| Between | No.25 (0.71mm) and No.35 (0.50mm) | 0.28 | 0.20 |
| Between | No.35 (0.50mm) and No.45 (0.35mm) | 0.29 | 0.07 |
| Between | No.45 (0.35mm) and No.60 (0.25mm) | 0.10 | |
| Smaller | than No.60 (0.25mm) | 0.06 | |

EXAMPLE II

Compound fertilizer was pelletized at the rate of 150 kg/hr. using the same pelletizing process as that described in Example I.

Conditions and results are shown below:

| | |
|---|---|
| Production rate: | 150 kg/hr. |
| Powdered solid substance: | Compound fertilizer |
| Fineness of the raw material: | 125 micron (under) 10% |
| Liquid substance: | Compound fertilizer solution (water content 90%) |

Operating conditions of the fluidized bed pelletizing process:
$u_o = 1.6$ m/sec.
$V_F/V_o = 0.62$
$V_J/V_o = 0.24$
$V_A/V_o + V_R/V_o = 0.14$
$u_j = 9$ m/sec.
$m = 8\%$ (wet basis)

| | |
|---|---|
| Temperature of the dryer: | 120°C |
| Moisture of the Products: | 2% (wet basis) |

Size distribution of the solid particles

| SIEVE (ASTM) | | IN THE BED | PRODUCTS |
|---|---|---|---|
| Larger | than No. 7 (2.83mm) | | 0.015 |
| Between | No. 7 (2.83mm) and No.10 (2.00mm) | 0.025 | 0.12 |
| Between | No.10 (2.00mm) and No.14 (1.41mm) | 0.12 | 0.32 |
| Between | No.14 (1.41mm) and NO.18 (1.00mm) | 0.25 | 0.34 |

-Continued

| | | |
|---|---|---|
| Between No.18 (1.00mm) and No.25 (0.71mm) | 0.34 | 0.16 |
| Between No.25 (0.71mm) and No.35 (0.50mm) | 0.21 | 0.045 |
| Smaller than No.35 (0.50mm) | 0.055 | |

As is apparent from the above explanation, the method of the present invention is suitable for continuous pelletizing operation in a fluidized bed and is more efficient and economical than the conventional pelletizing methods.

Further, the apparatus for carrying out the method is simple, and small pellets smaller than 5 mm in diameter are made efficiently and economically.

What is claimed is:

1. Apparatus for pelletizing a powdery solid substance by causing agglomeration to produce pellets of a predetermined minimum size, the combination of, a fluidizing vessel enclosing a fluidizing zone comprising side walls surrounding the periphery of said zone and a bottom wall structure defining the bottom of said zone, said vessel having a bottom pellet-discharge opening and said bottom wall structure extending downwardly toward said opening from said side walls at an acute angle to the horizontal, said bottom wall structure having gas-discharge openings for fluidizing gas, means to supply fluidizing gas through said gas discharge openings, means providing a vertical passageway extending upwardly to and concentric with said pellet-discharge opening, means directing a stream of fluidizing gas upwardly through said passageway at a controlled rate, means for delivering the powdery solid substance at a controlled rate into said vessel, means to deliver an agglomerating liquid to a zone within said vessel remote from said side walls and bottom wall structure, said stream of fluidizing gas being effective to produce an upward flow of gas from said pellet discharge opening and said first-mentioned fluidizing gas cooperating therewith to produce and maintain a fluidizing gas pattern throughout said fluidizing zone with the flow being upwardly from said pellet-discharge opening and thence horizontally to the upper portion of said side wall structure and thence downwardly past said side wall structure and thence along said bottom wall structure generally toward said pellet-discharge opening to complete the path, whereby the powdery solid substance and said liquid are entrained into said fluidizing gas and the liquid wets and agglomerates the powdery solid substance to form pellets the size of which is increased by surface wetting and contact with additional fragments of the solid substance, said stream of fluidizing gas flowing upwardly through said passageway at a controlled rate such that pellets which are smaller than said minimum size are carried upwardly into said fluidized zone and pellets of said minimum size are discharged through said passageway by the action of gravity.

2. Apparatus as described in claim 1 wherein said vessel has a gas-discharge outlet at a level above the top of said fluidizing zone, means to separate the solid discharged with gas through said gas-discharge opening and to exhaust the gas and deliver the solid substance back to said fluidizing zone.

3. Apparatus as described in claim 1 which includes means to supply gas under pressure with said powdery solid substance, and means to supply gas under pressure with said liquid.

4. Apparatus as described in claim 1 which includes means to collect and remove the pellets which pass downwardly through said passageway, and means to dry the pellets.

5. Apparatus as described in claim 1 wherein said bottom wall structure comprises a funnel shaped gas distributor with gas discharge openings throughout a frustoconical area.

6. Apparatus as described in claim 5 which includes a funnel shaped pellet collector positioned to receive the discharged pellets, and valve means to control the discharge of pellets from the bottom of said collector.

7. Apparatus as described in claim 6 wherein said collector includes means comprising a chamber which is closed except for the gas receiving passageway and for the bottom of said vertical passageway from said pellet-discharge opening through which pellets are discharged and gas flows upwardly, and means to supply a stream of gas to the enclosure formed by collector.

8. Apparatus as described in claim 7 wherein said liquid is discharged in a vertical direction, and means to supply a jet of gas in an annular stream around the liquid being discharged.

9. Apparatus as described in claim 7 wherein said solid substance is delivered into said vessel at substantially the top of said bottom wall structure, and means to provide a stream of gas into said vessel with said solid substance.

* * * * *